United States Patent
He et al.

(10) Patent No.: US 10,334,605 B2
(45) Date of Patent: Jun. 25, 2019

(54) TIME DOMAIN PILOT OF SINGLE-CARRIER MIMO SYSTEM AND SYNCHRONIZATION METHOD THEREOF

(71) Applicant: ZTE Wavetone Science and Technology Ltd., Nanjing, Jiangsu (CN)

(72) Inventors: Shiwen He, Jiangsu (CN); Yu Sun, Jiangsu (CN); Yu Wang, Jiagnsu (CN); Haiming Wang, Jiangsu (CN); Lyuxi Yang, Jiangsu (CN); Jun Zhang, Jiangsu (CN); Wei Hong, Jiangsu (CN); Hua Jiang, Jiagnsu (CN)

(73) Assignee: ZTE Wavetone Science and Technology Ltd., Nanjing, Jiangsu (CN)

( * ) Notice: Subject to any disclaimer, the term of this patent is extended or adjusted under 35 U.S.C. 154(b) by 20 days.

(21) Appl. No.: 15/507,295

(22) PCT Filed: Sep. 12, 2015

(86) PCT No.: PCT/CN2015/096856
§ 371 (c)(1),
(2) Date: Feb. 28, 2017

(87) PCT Pub. No.: WO2016/107386
PCT Pub. Date: Jul. 7, 2016

(65) Prior Publication Data
US 2017/0265202 A1 Sep. 14, 2017

(30) Foreign Application Priority Data
Dec. 30, 2014 (CN) .......................... 2014 1 0842914

(51) Int. Cl.
*H04L 5/00* (2006.01)
*H04L 7/00* (2006.01)
(Continued)

(52) U.S. Cl.
CPC ........ *H04W 72/082* (2013.01); *H04B 7/0413* (2013.01); *H04L 5/0048* (2013.01);
(Continued)

(58) Field of Classification Search
CPC ..... H04J 13/22; H04J 13/0055; H04L 1/0041; H04L 5/0048; H04L 7/08; H04L 27/2607;
(Continued)

(56) References Cited

U.S. PATENT DOCUMENTS

| | | | |
|---|---|---|---|
| 8,238,496 B1 | 8/2012 | Narasimhan et al. | |
| 2007/0230600 A1* | 10/2007 | Bertrand ................. | H04J 13/00 375/260 |

(Continued)

FOREIGN PATENT DOCUMENTS

| | | |
|---|---|---|
| CN | 103179062 | 6/2013 |
| CN | 103220242 | 7/2013 |

(Continued)

*Primary Examiner* — Shuwang Liu
*Assistant Examiner* — Sung Ahn
(74) *Attorney, Agent, or Firm* — Rankin, Hill & Clark LLP (57) ABSTRACT

The present invention discloses a time domain pilot design solution suitable for a single-carrier MIMO system. The design solution comprises a time domain pilot location design and a training sequence design. In the present invention, several identical ZCZ sequences are uniformly inserted into each of the data blocks in the same data stream to serve as training sequences, wherein the training sequences inserted into different data streams are different. In addition, the present invention also discloses a simple algorithm for pilot tracking and phase correction suitable for the time domain pilot design solution for the single-carrier MIMO system. The time domain pilot design solution for a single-carrier MIMO system and the algorithm for pilot tracking
(Continued)

and phase correction as disclosed in the present invention can improve the performance of a system.

2 Claims, 7 Drawing Sheets (51) Int. Cl.
*H04L 7/08* (2006.01)
*H04L 27/26* (2006.01)
*H04W 72/04* (2009.01)
*H04W 72/08* (2009.01)
*H04B 7/0413* (2017.01)

(52) U.S. Cl.
CPC .............. *H04L 7/0087* (2013.01); *H04L 7/08* (2013.01); *H04L 27/2607* (2013.01); *H04L 27/2611* (2013.01); *H04L 27/2613* (2013.01); *H04L 27/2656* (2013.01); *H04L 27/2657* (2013.01); *H04L 27/2675* (2013.01); *H04L 27/2692* (2013.01); *H04W 72/046* (2013.01)

(58) Field of Classification Search
CPC ............. H04L 27/2613; H04L 27/2656; H04L 27/2692; H04W 72/082; H04W 72/046; H04B 7/0413
See application file for complete search history.

(56) References Cited

U.S. PATENT DOCUMENTS

| | | | | |
|---|---|---|---|---|
| 2010/0002757 | A1* | 1/2010 | Birru | .................... H04L 27/2657 375/226 |
| 2011/0305296 | A1* | 12/2011 | Van Nee | ................ H04L 5/0053 375/295 |
| 2012/0127961 | A1* | 5/2012 | Kawamura | ............. H04L 5/001 370/335 |

FOREIGN PATENT DOCUMENTS

| | | |
|---|---|---|
| CN | 103269321 | 8/2013 |
| CN | 103973608 | 8/2014 |
| CN | 104580057 | 4/2015 |

* cited by examiner

TIME DOMAIN PILOT OF SINGLE-CARRIER MIMO SYSTEM AND SYNCHRONIZATION METHOD THEREOF

FIELD OF THE INVENTION

The present invention relates to a time domain pilot method of a single-carrier multiple-input multiple-output (MIMO) system and a synchronization method corresponding thereto, belonging to the technical field of wireless communication system.

BACKGROUND

Traditional MIMO systems are mostly combined with the multi-carrier orthogonal frequency division multiplexing (OFDM) technology. However, the OFDM has the problem of higher peak-to-average ratio and sensitivity to frequency offset and phase noise. In contrary, the single carrier (SC) technology lowers the peak-to-average ratio and the sensitivity to frequency offset and phase noise, therefore, the MIMO system combined with SC also attracts extensive attention. In the single-carrier MIMO system, though not so sensitive as the OFDM system, the influence of sampling frequency offset and phase noise on the performance of a system is still non-ignorable. A common solution is to insert pilot frequencies into data for frequency offset estimation and phase tracking.

The existing pilot design solutions are divided into two types. The first type is time domain pilot, which means that known time domain sequences are inserted into data for frequency offset estimation and phase correction. In a typical time domain pilot design solution of a single-carrier system, a unique word (UW) is inserted into data, and the UW is utilized for synchronization and also for substituting a cyclic prefix (CP) to resist against the multipath effect. However, the MIMO system often needs a cyclic shift operation, which means that the directly inserted UW cannot replace the CP to resist against multipath, and thus may also cause interference between symbols. Therefore, the traditional UW time domain pilot design solution is not suitable for the single-carrier MIMO system. In another commonly used single-carrier pilot solution, pilot design is conducted in a frequency domain, which however generally requires the addition of modules for FFT and IFFT operations in a transmitting terminal. Therefore, compared with time domain pilot, the pilot of frequency domain may increase the complexity of the transmitting terminal of a system. In addition, the time domain pilot design of a single-carrier MIMO system also has the problem of mutual interference of pilot frequencies between different antennas.

BRIEF DESCRIPTION

Object of the invention: To overcome the shortcomings existing in the prior art, the present invention proposes a time domain pilot method suitable for a single-carrier MIMO system, including pilot location design and a training sequence design, and also provides a synchronization method that can be adopted based on the time domain pilot design for frequency offset estimation and phase tracking.

Technical solution: To eliminate the correlation of signals between different antennas and eliminate undesired beam forming effects, a cyclic shift operation (CSD) often needs to be performed on signals of different antennas in the MIMO system. In addition, to resist against the multipath and avoid interference between symbols, a CP needs to be inserted at the transmitting terminal. In the present invention, after constellation point mapping, a pilot frequency needs to be inserted before the CSD operation.

The present invention provides a time domain pilot method of a single-carrier MIMO system, comprising the following steps:

(1) generating training sequences (TS) to be inserted;

(2) inserting the TS sequences into data blocks at intervals of an identical number of data symbols, wherein the TS sequences inserted into each data block are no less than one; and (3) after CSD operation and space mapping on the data blocks into which the TS sequences are inserted, inserting CPs before the transformed data blocks, wherein the last few digits of the CP are the TS sequences inserted into the data block.

The TS sequences inserted into each data block in a same data stream are identical, while the TS sequences inserted into different data streams are different.

The TS sequence adopts a ZCZ sequence. Due to its favorable autocorrelation and cross-correlation properties, the ZCZ sequence can be adopted to reduce the influence of mutual interference between pilot frequencies of different antennas.

The present invention also provides a transmitting device for implementing time domain pilot of a single-carrier MIMO system, comprising a time domain pilot module, a CSD module, a space mapping module and a CP inserting module, wherein the time domain pilot module is used for generating TS sequences, and uniformly inserting the TS sequences in data blocks; the CSD module is used for performing CSD operation on the data blocks in which the TS sequences are inserted; the space mapping module is used for performing space mapping on the data blocks subjected to the CSD operation; and the CP inserting module is used for inserting CPs before the data blocks subjected to the space mapping.

Figure 2:
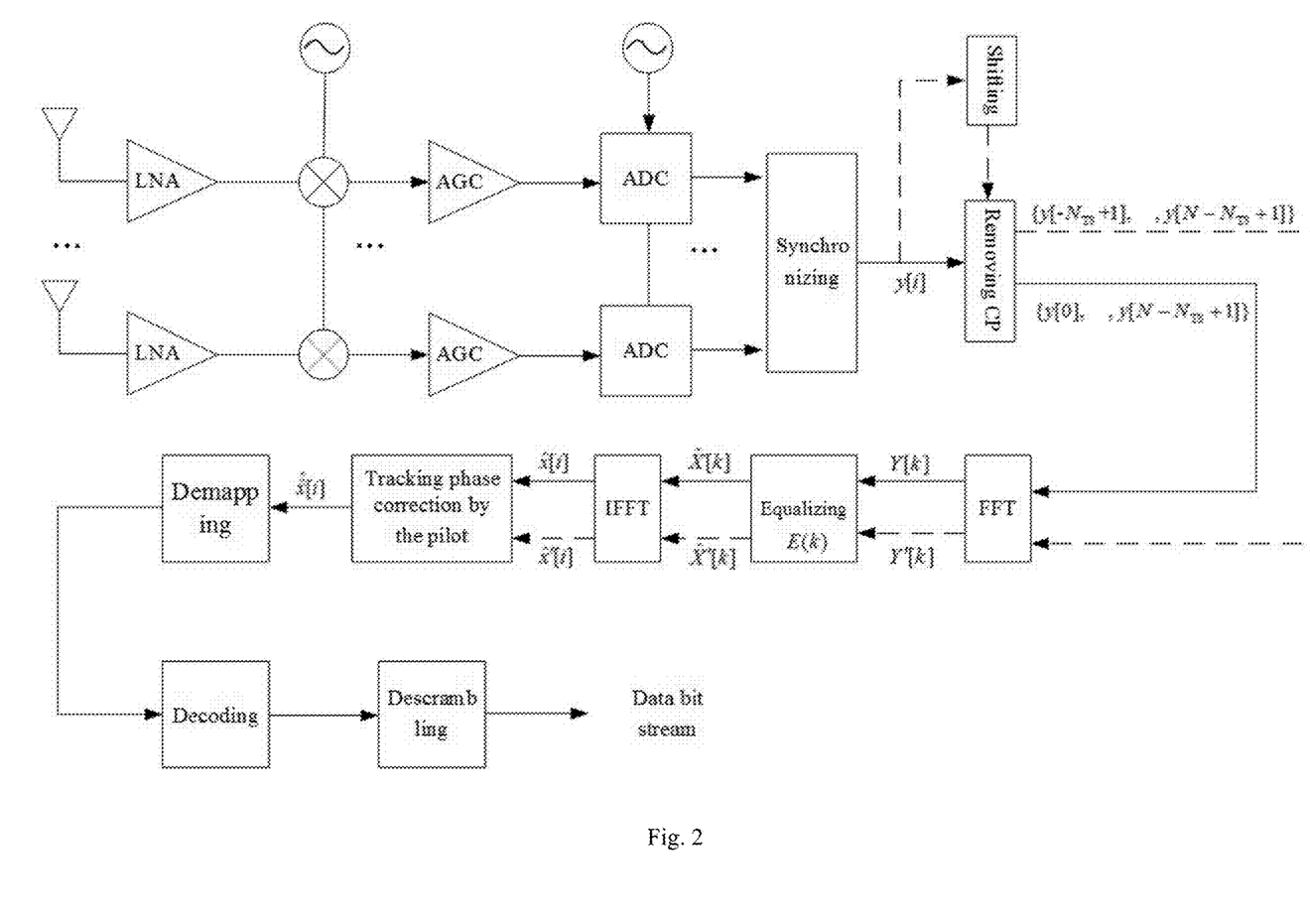
FIG. 2 is a block diagram of a receiving device of a single-carrier MIMO system in the present invention.

The present invention further provides a synchronization method based on time domain pilot of a single-carrier MIMO system, in which carrier frequency offset estimation and phase tracking are conducted with data blocks as a unit, comprising the following steps:

(1) Performing FFT, equalization and IFFT transformation on received data blocks, and estimating a phase error at a central symbol position of each TS sequence in the data blocks:

FFT of N points is performed on the received time domain signal y[i], i=1, 2, ..., N to obtain the frequency domain signal Y[k], k=1, 2, ..., N, namely:

$$Y[k] = \sum_{i=1}^{N} y[i] e^{-j\frac{2\pi ki}{N}}, k = 1, 2, \ldots, N. \quad \text{(formula 2)}$$

The operation corresponds to the FFT module in the receiving device block diagram in FIG. 2.

Supposing that the transmission function of a frequency domain equalizer is E(k), then after the frequency domain signal Y[k], k=1, 2, ..., N is subjected to the frequency domain equalizer, we obtain:

$$\hat{X}[k] = E(k)Y[k], k=1, N \quad \text{(formula 3)}.$$

The operation corresponds to the equalization module in the receiving device block diagram in FIG. 2.

IFFT transformation is performed on the equalized signal $\hat{X}[k], k=1, 2, \ldots, N$, to obtain the time domain signal $\hat{x}[i]$, $i=1, 2, \ldots, N$, namely:

$$\hat{x}[i] = \frac{1}{N}\sum_{k=1}^{N} \hat{X}[k]e^{j\frac{2\pi ki}{N}}, i = 1, 2, \ldots, N. \quad \text{(formula 4)}$$

The operation corresponds to the IFFT module in the receiving device block diagram in FIG. 2.

If $r_m[i], i=1, 2, \ldots, N_{TS}, m=1, 2, \ldots, M$ is used to represent the $i^{th}$ pilot symbol in the $m^{th}$ TS sequence in the current equalized data symbol block, then $r_m[i]$ and $\hat{x}[i]$ satisfy the following relational expression:

$$r_m[i] = \hat{x}[mN_D + (m-1)N_{TS} + i]$$

$$i=1,2,\ldots,N_{TS},\ m=1,2,\ldots,M \quad \text{(formula 5)}.$$

A phase error at a central symbol position of each TS sequence in data blocks is calculated by using a calculation method below:

$$\theta_m = \angle\left(\sum_{i=1}^{N_{TS}} r_m[i]s^*[i]\right), m = 1, 2, \ldots, M, \quad \text{(formula 6)}$$

wherein $\angle$ represents angle calculation on a complex number, and $s[i], i=1, 2, \ldots, N_{TS}$ represents the inserted TS sequence.

Figure 4:
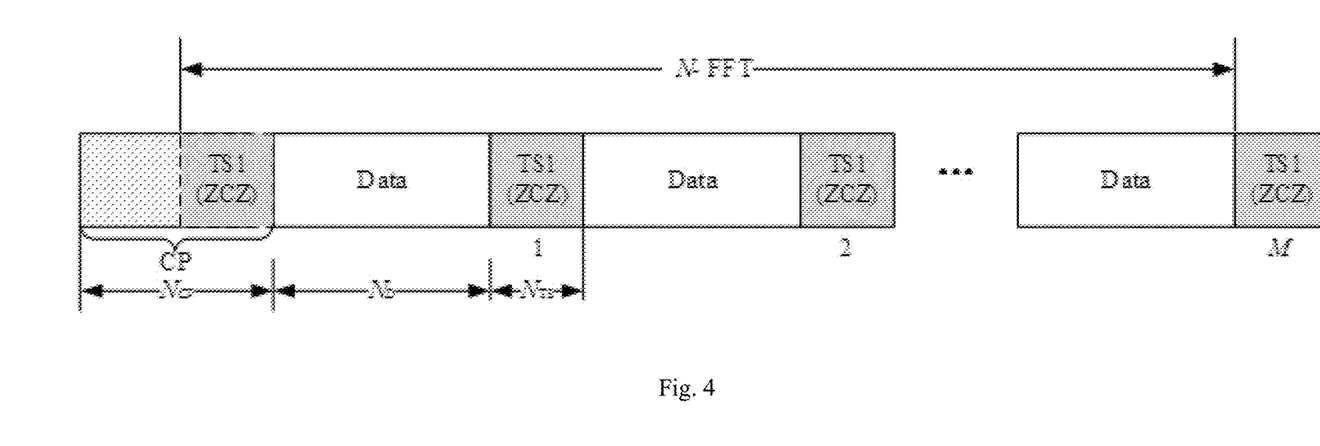
FIG. 4 is a schematic diagram of FFT operation on the shifted received data in the present invention.

(2) Utilizing the TS sequence in the CP for shifting, performing FFT, equalization and IFFT transformation on the shifted data blocks, and estimating a phase error at an initial position of data blocks:

FFT of N points is performed on the received data symbol $\{y[-N_{TS}+1], \ldots, y[-1], y[0], y[i], \ldots y[N-N_{TS}+1]\}$ to obtain $Y'[k], k=1, 2, \ldots, N$, as shown in FIG. 4.

E(k) equalization is performed on the frequency domain signal $Y'[k], k=1, 2, \ldots, N$ through a frequency domain equalizer to obtain:

$$\hat{X}'[k] = E(k)Y'[k], k=1,2,\ldots,N \quad \text{(formula 7)}.$$

IFFT transformation is performed on $\hat{X}'[k], k=1, 2, \ldots, N$ to obtain the time domain signal $\hat{x}'[i], i=1, 2, \ldots, N$.

A phase error at an initial position of the data blocks is calculated by using a calculation method below:

$$\theta_0 = \angle\left(\sum_{i=1}^{N_{TS}} \hat{x}'[i]s^*[i]\right). \quad \text{(formula 8)}$$

(3) Estimating and compensating for a phase error of each data symbol $\hat{x}[i], i=1, 2, \ldots, N$ in the data blocks:

Linear interpolation is performed on $\theta_m, m=0, 1, 2, \ldots, M$ to obtain a phase error on each data symbol in the data blocks, with a calculation method below:

$$\theta[i] = \begin{cases} \frac{\theta_1 - \theta_0}{N_D + N_{TS}}\left(i - N_D - \left\lceil\frac{N_{TS}+1}{2}\right\rceil\right) + \theta_1, & \text{if } 1 \le i < N_D + \left\lceil\frac{N_{TS}+1}{2}\right\rceil \\ \frac{\theta_m - \theta_{m-1}}{N_D + N_{TS}}\left(i - mN_D - (m-1)N_{TS} - \left\lceil\frac{N_{TS}+1}{2}\right\rceil\right) + \theta_m, & \text{if } a \le i < b \end{cases} \quad \text{(formula 9)}$$

wherein $$a = (m-1)N_D + (m-2)N_{TS} + \left\lceil\frac{N_{TS}+1}{2}\right\rceil,$$

$$b = mN_D + (m-1)N_{TS} + \left\lceil\frac{N_{TS}+1}{2}\right\rceil.$$

Phase error compensation is performed on each data symbol by using a compensation method below:

$$\hat{\hat{x}}[i] = \hat{x}[i]\Box e^{-j\theta[i]}, i=1,2,\ldots,N \quad \text{(formula 10)}.$$

The present invention also provides a receiving device for implementing synchronization based on a single-carrier MIMO system, comprising a shifting module, an FFT module, an equalization module, an IFFT module and a phase correction module, wherein the shifting module is used for performing shifting operation on received data blocks; the FFT module is used for performing FFT transformation on the received data blocks and the shifted data blocks; the equalization module is used for performing equalization on the data blocks subjected to the FFT transformation; the IFFT module is used for performing IFFT transformation on the equalized data blocks; and the phase correction module is used for performing phase error estimation and compensation on the data blocks subjected to the IFFT transformation.

Beneficial effects: The time domain pilot method provided in the present invention overcomes the shortcoming that traditional single-carrier time domain pilot design is not suitable for the MIMO system, and a synchronization method that can be adopted based on the time domain pilot design is provided. Simulation proves that the performance is improved. In addition, the time domain pilot in the present invention has a unique structure. When the system detects that the path number of the current channel is less than a certain value, the present design can effectively reduce the complexity of the whole system, improve the processing speed, which is of great importance to the superspeed wireless communication system.

DETAILED DESCRIPTION

With the millimeter wave wireless local area network IEEE 802.11aj (45 GHz) as an example, specific embodiments of the present invention are further described below in detail in conjunction with the accompanying drawings. It should be understood that these embodiments are merely used for illustrating the present invention, rather than limiting the scope of the present invention. After reading the present invention, various equivalent modifications made to the present invention by those skilled in the art fall within the claims appended in the present application.

Figure 1:
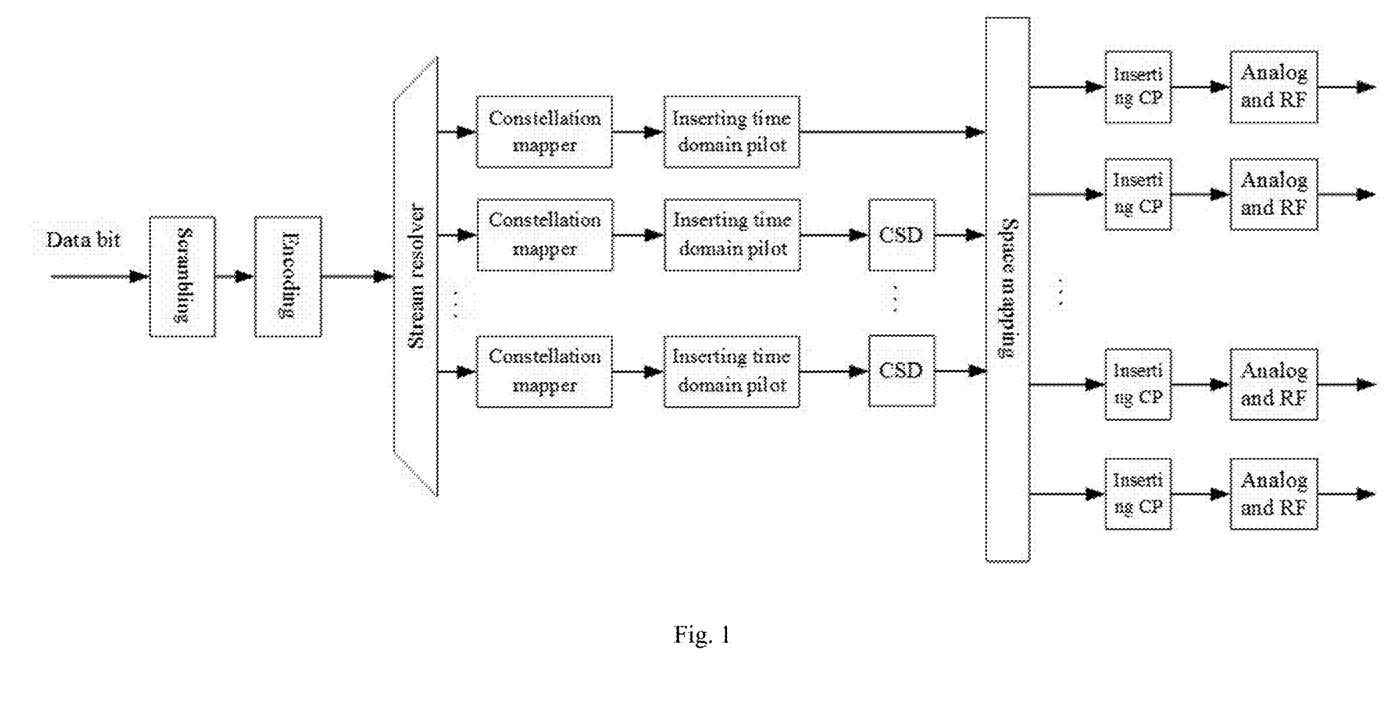
FIG. 1 is a block diagram of a transmitting device of a single-carrier MIMO system in the present invention.

A transmitting device of a single-carrier MIMO system as shown in FIG. 1 includes a time domain pilot module, a CSD module, a space mapping module and a CP inserting module, wherein the time domain pilot module is used for generating TS sequences, and uniformly inserting the TS sequences in data blocks; the CSD module is used for performing CSD operation on the data blocks in which the TS sequences are inserted; the space mapping module is used for performing space mapping on the data blocks subjected to the CSD operation; and the CP inserting module is used for inserting CPs before the data blocks subjected to the space mapping.

A receiving device of a single-carrier MIMO system as shown in FIG. 2 includes a shifting module, an FFT module, an equalization module, an IFFT module and a phase correction module, wherein the shifting module is used for performing shifting operation on received data blocks; the FFT module is used for performing FFT transformation on the received data blocks and the shifted data blocks; the equalization module is used for performing equalization on the data blocks subjected to the FFT transformation; the IFFT module is used for performing IFFT transformation on the equalized data blocks; and the phase correction module is used for performing phase error estimation and compensation on the data blocks subjected to the IFFT transformation.

Figure 3:
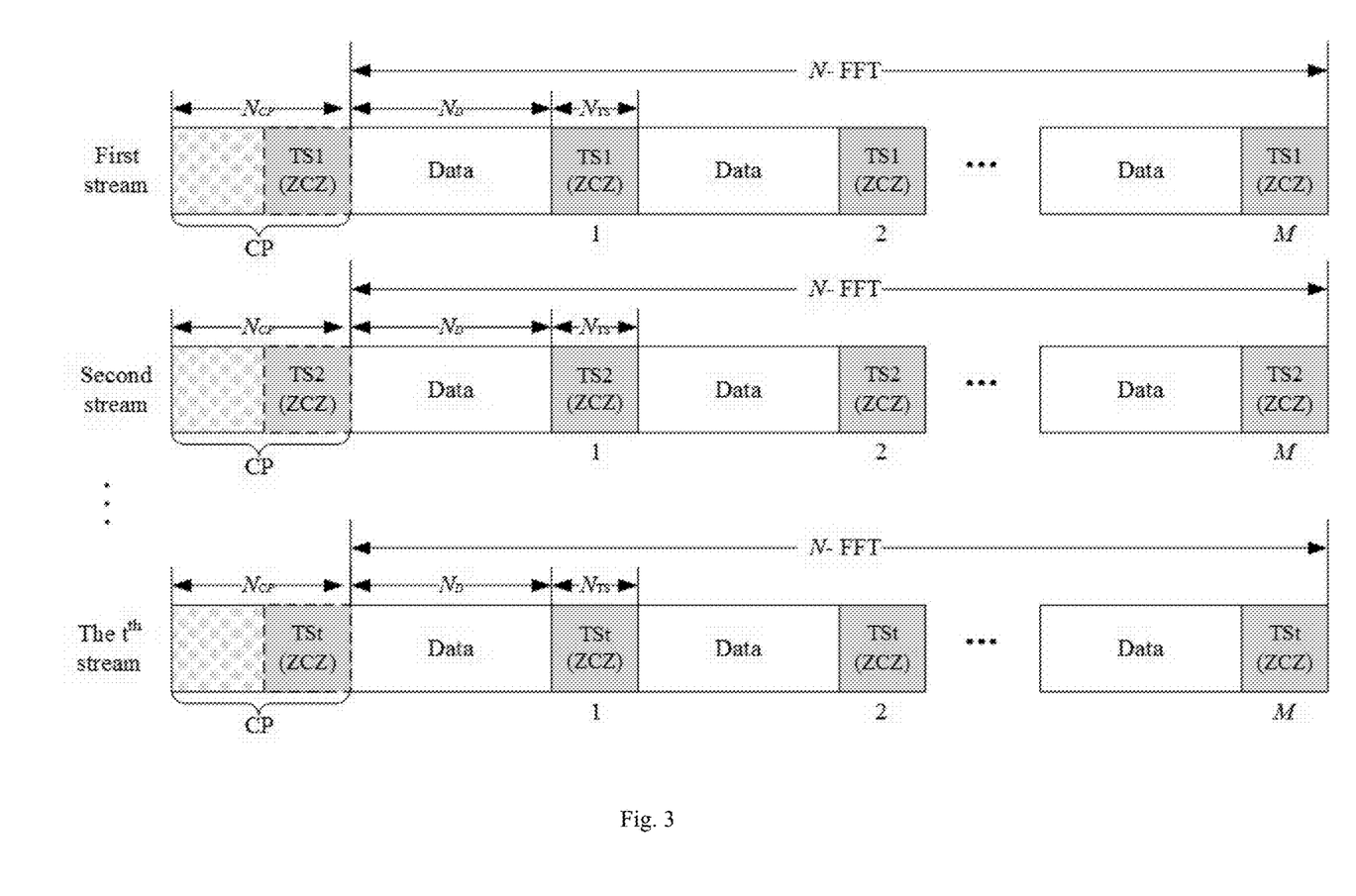
FIG. 3 is a structural schematic diagram of data with pilot frequencies inserted in the present invention.

FIG. 3 is a structural schematic diagram of data with pilot frequencies inserted in the present invention. In each data block of the same data stream of the present invention, namely, in each data symbol contained in each FFT operation, several identical training sequences (TSs) are uniformly inserted; the CP is inserted before each data block, the number of the TS sequences inserted into each data block is greater than or equal to 1, and the length of the inserted TS sequence is less than that of the inserted CP; the TS sequences inserted into each data block of the same data stream are identical, while the TS sequences inserted into different data streams are different; and the TS sequence adopts a ZCZ sequence.

Supposing that N represents the length of FFT operation, namely, the total length of a data block containing the pilot sequence and the data symbols, $N_{TS}$ represents the length of each section of separate TS sequence, $N_D$ represents the number of data symbols spaced between every two adjacent TS sequences, M represents the number of TS sequences inserted into each separate data block, and $N_{CP}$ represents the length of the cyclic prefix, then M, $N_{TS}$, N, $N_D$, and $N_{CP}$ are all integers and satisfy the following relationship:

$$MN_{TS}+MN_D=N,$$

$$N_{TS}<N_{CP}, M\geq 1 \quad \text{(formula 1)}.$$

Figure 5:
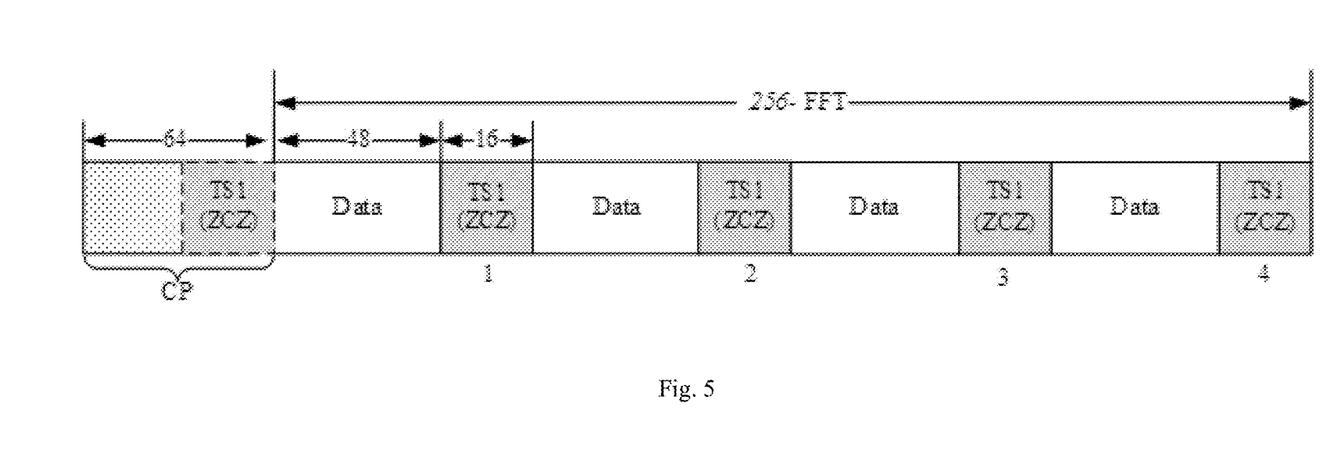
FIG. 5 is a structural diagram of data in specific embodiments in the present invention.

In the present embodiment, the specific steps of inserting time domain pilot frequencies into a transmitting terminal are as follows:

Step 1: determining the following parameter values: the total length N of each data block is 256, and the length includes the number of data symbols and the number of time domain pilot symbols, the length of CP ($N_{CP}$) in the data blocks is 64, the number M of TS sequences inserted into each separate data block is 4, the length $N_{TS}$ of each TS sequence is 16, the number $N_D$ of data symbols spaced between every two adjacent TS sequences is 48; obviously, the parameters M, $N_{TS}$, N, $N_D$ and $N_{CP}$ satisfy the relationship shown in formula 1;

Step 2: generating the TS sequence on the $t^{th}$ stream, namely, the ZCZ sequence with the length of $N_{TS}$:

$s_t[1], s_t[2], \ldots, s_t[i], \ldots s_t[N_{TS}]$;

Step 3: after being subjected to a constellation mapper, inserting the ZCZ sequence $s_t[1], s_t[2], \ldots, s_t[i], \ldots s_t[N_{TS}]$ generated in step 2 into data blocks of corresponding data streams at intervals of $N_D$ data symbols;

Step 4: subjecting the data symbols with the time domain pilot inserted therebetween to the CSD and space mapping modules of a single-carrier MIMO transmitting system, and inserting a CP before each data block. The finally formed data structure is as shown in FIG. 5.

The phase offset models of the specific embodiments will be described below, which are shown as follows:

$$PSD(f) = PSD(0)\left[\frac{1+(f/f_z)^2}{1+(f/f_p)^2}\right], \quad \text{(formula 11)}$$

wherein PSD(0)=−85 dBc/Hz, PSD(∞)=−125 dBc/Hz, the pole frequency $f_p$=1 MHz and the zero frequency $f_z$=100 MHz.

In the present embodiment, the receiving terminal performs estimation and correction of a phase error on each data block in each stream, comprising the following specific steps:

Step 1: performing FFT of 256 points on the received time domain signal y[i], i=1, 2, . . . , 256, to obtain Y[k], k=1, 2, . . . , 256, namely $$Y[k] = \sum_{i=1}^{256} y[i]e^{-j\frac{2\pi ki}{256}}, k = 1, 2, \ldots, 256; \quad \text{(formula 12)}$$

Step 2: equalizing the frequency domain signal Y[k], k=1, 2, . . . , 256 through a frequency domain equalizer to obtain $\hat{X}[k]$, k=1, 2, . . . , 256, and supposing that the transmission function of the frequency domain equalizer is E(k), then:

$$\hat{X}[k]=E(k)Y[k], k=1,2,\ldots,256 \quad \text{(formula 13)};$$

Step 3: transforming the signal $\hat{X}[k]$, k=1, 2, . . . , 256 output from the equalizer into a time domain signal through IFFT transformation, wherein $\hat{x}[i]$, i=1, 2, . . . , N represents a time domain signal obtained after $\hat{X}[k]$, k=1, 2, . . . , N is subjected to IFFT, then:

$$\hat{x}[i] = \frac{1}{N}\sum_{k=1}^{256} \hat{X}[k]e^{j\frac{2\pi ki}{256}}, i = 1, 2, \ldots, 256 \quad \text{(formula 14)}$$

wherein $r_m[i], i=1, 2, \ldots, 16, m=1, 2, 3, 4$ represents the $i^{th}$ pilot symbol of the $m^{th}$ TS sequence in the equalized current data symbol block, then $r_m[i]$ and $\hat{x}[i]$ satisfy the following relationship:

$$r_m[i]=\hat{x}[48m+16(m-1)+i]$$

$$i=1,2,\ldots,16, m=1,2,3,4 \quad \text{(formula 15)};$$

Step 4: calculating to obtain:

$$\theta_m = \angle\left(\sum_{i=1}^{16} r_m[i]s^*[i]\right), m = 1, 2, 3, 4; \quad \text{(formula 16)}$$

Figure 6:
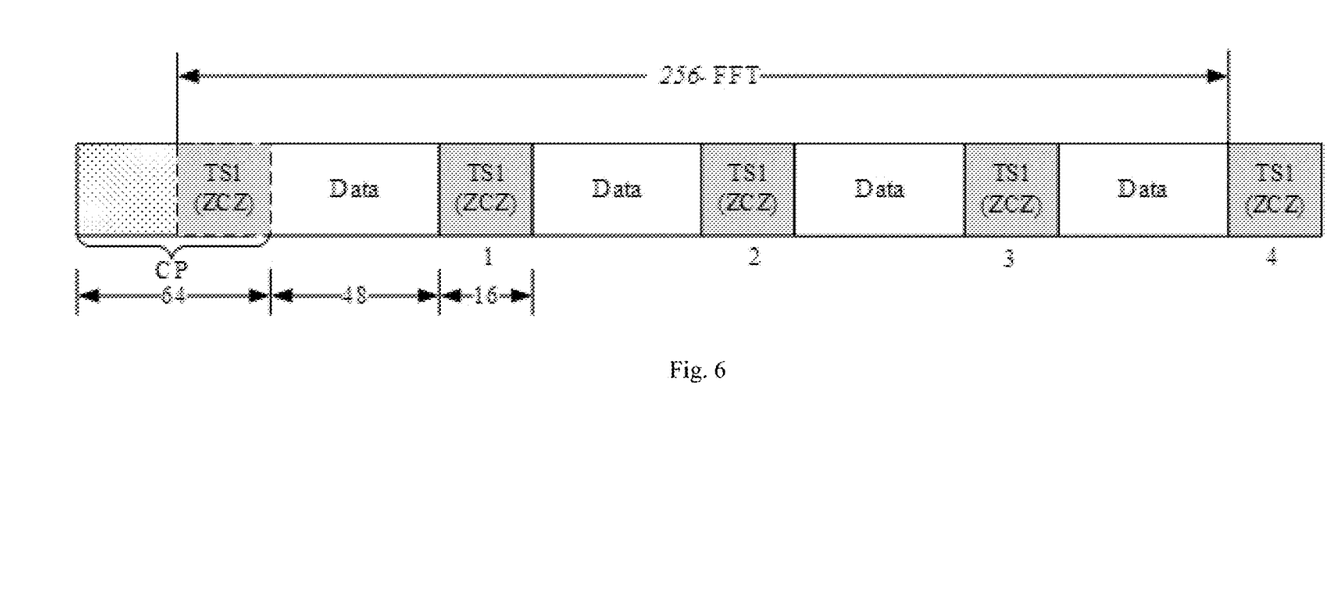
FIG. 6 is a schematic diagram of FFT operation after shifting in specific embodiments of the present invention.

Step 5: performing FFT of 256 points on the received data symbol $\{y[-15], \ldots, y[-1], y[0], y[1], \ldots, y[i], \ldots y[N-15]\}$, to obtain $Y'[k], k=1, 2, \ldots, 256$ after FFT operation, as shown in FIG. 6;

Step 6: performing E(k) equalization on $Y'[k], k=1, 2, \ldots, 256$ through a frequency domain equalizer to obtain $\hat{X}'[k], k=1, 2, \ldots, 256$ and $\hat{X}'[k]=E(k)Y'[k], k=1, 2, \ldots, 256$;

Step 7: performing IFFT transformation on $\hat{X}'[k], k=1, 2, \ldots, 256$, to obtain the time domain signal $\hat{x}'[i], i=1, 2, \ldots, 256$;

Step 8: calculating $\theta_0$, namely, a phase error at an initial position, by using a calculation method as follows:

$$\theta_0 = \angle\left(\sum_{i=1}^{16} \hat{x}'[i]s^*[i]\right); \quad \text{(formula 17)}$$

Step 9: calculating the phase error $\theta[i], i=1, 2, \ldots, 256$ corresponding to each data symbol in data symbol blocks by utilizing $\theta_m, m=0, 1, 2, 3, 4$, with the calculation method as follows:

$$\theta[i] = \begin{cases} \frac{\theta_1 - \theta_0}{64}(i-48-9) + \theta_1, & \text{if } 1 \leq i < 57 \\ \frac{\theta_m - \theta_{m-1}}{64}(i-48m-16(m-1)-9) + \theta_m, & \text{if } a \leq i < b \end{cases} \quad \text{(formula 18)}$$

wherein $a=48(m-1)+16(m-2)+9$, $b=48m+16(m-1)+9$;

Step 10: performing phase error compensation on $\hat{x}[i], i=1, 2, \ldots, 256$ obtained in step 3 by $\theta[i], i=1, 2, \ldots, 256$ obtained in step 9, with the compensation method as follows:

$$\hat{\hat{x}}[i]=\hat{x}[i]\cdot e^{-j\theta[i]}, i=1,2,\ldots,256 \quad \text{(formula 19)}.$$

Figure 7:
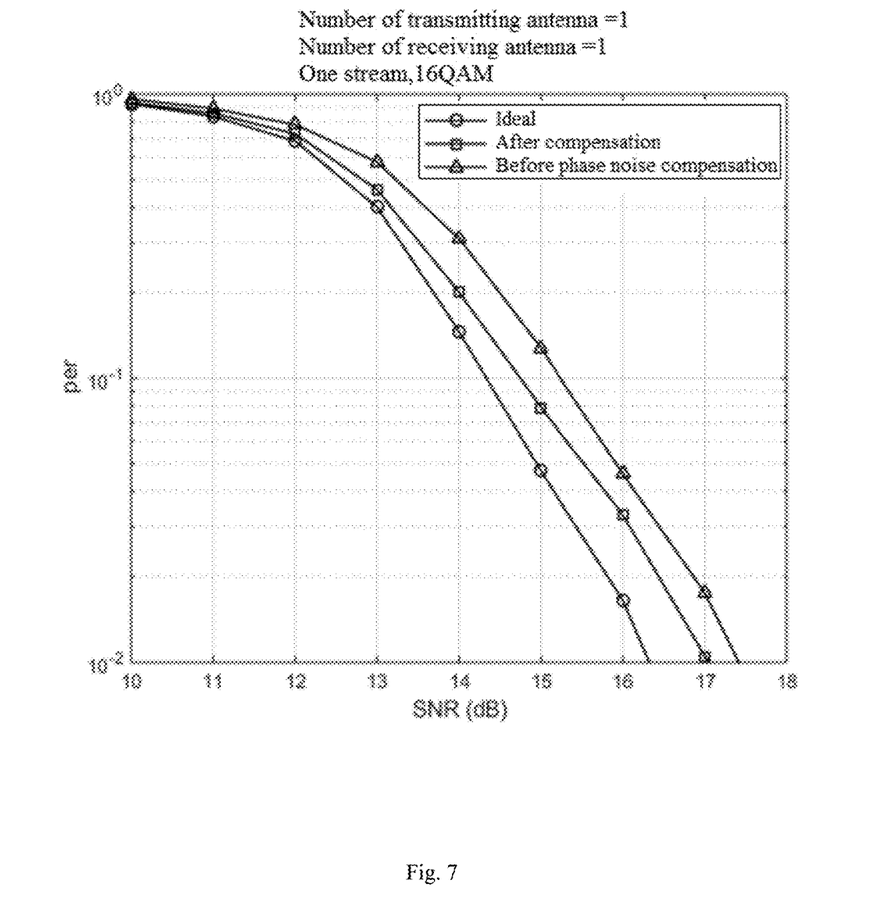
FIG. 7 is a simulation diagram of SISO phase noise performance in the embodiments of the present invention, wherein the simulation parameters include one transmitting antenna, one receiving antenna, one stream, and 16 QAM (Quadrature Amplitude Modulation)
Figure 8:
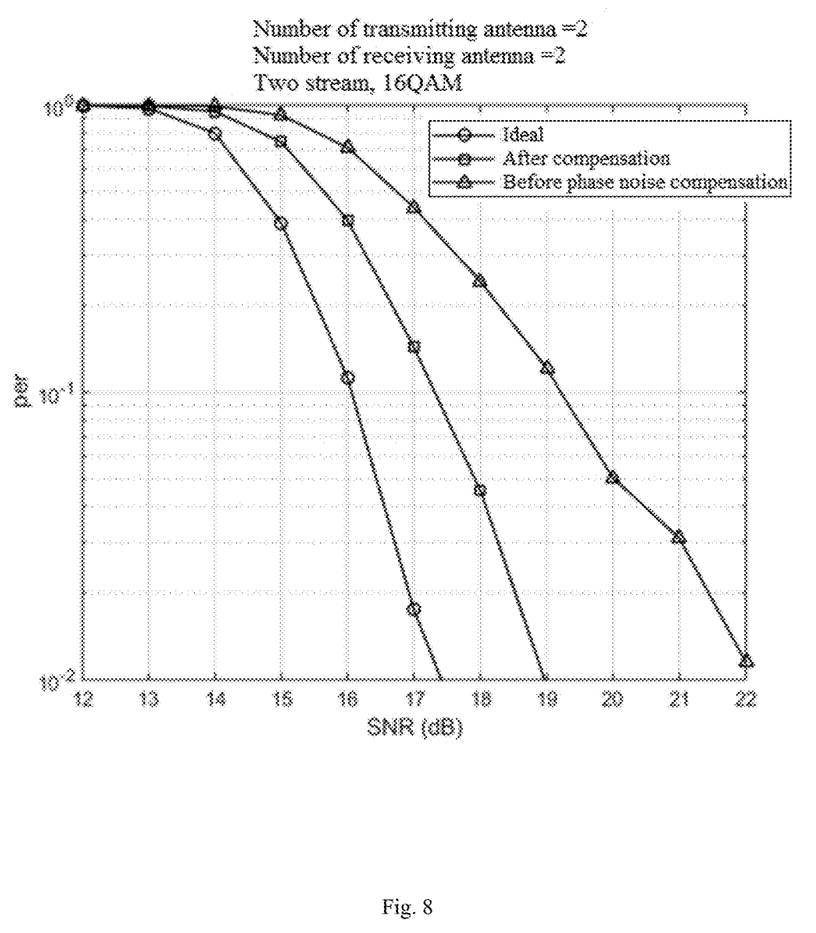
FIG. 8 a simulation diagram of MIMO phase noise performance in the embodiments of the present invention, wherein the simulation parameters include 2 transmitting antennas, 2 receiving antennas, 2 streams, and 16 QAM (Quadrature Amplitude Modulation).

To show the performance improvement of the present invention, the embodiments of the present invention also provide a simulation performance diagram, as shown in FIGS. 7 and 8. From the figures, it can be seen that the present invention can effectively track the phase and obviously improve the performance.

The invention claimed is:

1. A synchronization method based on time domain pilot of a single-carrier multi-input multi-output (MIMO) system, comprising the following steps:
   (1) performing fast Fourier transformation (FFT), equalization and inverse fast Fourier transformation (IFFT) on data blocks received from different antennas, and estimating a phase error at a central symbol position of each training sequence (TS) in the data blocks;
   (2) shifting the TS sequence in a cyclic prefix (CP);
   (3) utilizing the TS sequence in the CP for shifting, performing FFT, equalization and IFFT transformation on the data blocks in which the TS sequence is shifted, and estimating a phase error at an initial position of data blocks; and
   (4) estimating and compensating for a phase error of each data symbol in the data blocks,
   wherein the method for estimating the phase error of each data symbol is as follows:
   supposing $N_{TS}$ represents the length of the TS sequence, $N_D$ represents the number of data symbols between every two adjacent TS sequences, M represents the number of TS sequences inserted into each data block; $s[i], i=1, 2, \ldots, N_{TS}$ represents the inserted TS sequences; $\hat{x}'[i], i=1, 2, \ldots, N$ represents a time domain signal obtained after FFT, equalization and IFFT transformation of N points is performed on the received time domain signal $y[i], i=1, 2, \ldots, N$; $r_m[i], i=1, 2, \ldots, N_{TS}, m=1, 2, \ldots, M$ represents the $i^{th}$ pilot symbol of the $m^{th}$ TS sequence in the transformed data symbol block; and $\hat{x}'[i], i=1, 2, \ldots, N$ represents a time domain signal obtained after FFT, equalization and IFFT transformation of N points is performed on the received data symbol $\{y[-N_{TS}+1], \ldots, y[-1], y[0], y[1], y[2], \ldots, y[i], \ldots y[N-N_{TS}+1]\}$, then
   the phase error at the central symbol position of each TS sequence in the data block is as follows:

$$\theta_m = \angle\left(\sum_{i=1}^{N_{TS}} r_m[i]s^*[i]\right), m = 1, 2, \ldots, M \quad \text{(formula 12)}$$

the phase error at the initial position of the data block is as follows:

$$\theta_0 = \angle\left(\sum_{i=1}^{N_{TS}} \hat{x}'[i]s^*[i]\right) \quad \text{(formula 14)}$$

the phase error of each data symbol $\hat{x}'[i], i=1, 2, \ldots, N$ in the data block is as follows:

$$\theta[i] = \begin{cases} \frac{\theta_1 - \theta_0}{N_D + N_{TS}}\left(i - N_D - \left\lceil\frac{N_{TS}+1}{2}\right\rceil\right) + \theta_1, & \text{if } 1 \leq i < N_D + \left\lceil\frac{N_{TS}+1}{2}\right\rceil \\ \frac{\theta_m - \theta_{m-1}}{N_D + N_{TS}}\left(i - mN_D - (m-1)N_{TS} - \left\lceil\frac{N_{TS}+1}{2}\right\rceil\right) + \theta_m, & \text{if } a \leq i < b \end{cases} \quad \text{(formula 15)}$$

-continued wherein $$a = (m-1)N_D + (m-2)N_{TS} + \left\lceil \frac{N_{TS}+1}{2} \right\rceil,$$

$$b = mN_D + (m-1)N_{TS} + \left\lceil \frac{N_{TS}+1}{2} \right\rceil.$$

2. The synchronization method based on time domain pilot of a single-carrier MIMO system of claim 1, wherein the method of phase error compensation is as follows:

$$\overset{\circ}{x}[i] = \hat{x}'[i] \Box e^{-j\Theta[i]}, \quad i=1,2,\ldots,N \qquad \text{(formula 16)},$$

wherein $\hat{x}'[i], i=1, 2, \ldots, N$ represents a time domain signal obtained after FFT where the N represents a number of samples, equalization and IFFT transformation of N points is performed on the received data symbol y[i], i=1, 2, ..., N; and $\theta_i$=1, 2, ..., N represents a phase error of each data symbol in the data blocks.

* * * * *